Aug. 9, 1966 C. F. SHUTE 3,265,383
FILM SHEET FEEDER
Filed April 22, 1965

CHARLES F. SHUTE
INVENTOR.

BY R. Frank Smith
David P. Ogden

ATTORNEYS

3,265,383
FILM SHEET FEEDER

Charles F. Shute, Rochester, N.Y., assignor to Eastman Kodak Company, Rochester, N.Y., a corporation of New Jersey
Filed Apr. 22, 1965, Ser. No. 450,031
8 Claims. (Cl. 271—11)

This is a continuation-in-part of application Serial No. 393,194, filed August 31, 1964.

The present invention relates to a film sheet feeder and more particularly to an arrangement which may be preloaded to sequentially present a series of film sheets to a processing equipment to be developed thereby.

Several apparatus for processing film having a gelatinous coating on one or both sides are well known in the present state of the art. One of the more recent types of automatic film sheet developing processors uses self-threading roller transports whereby the film sheets move edgewise through the solutions in developing tanks between a plurality of rollers which transport and guide the film therethrough. Since these transport mechanisms are self-threading, the processor requires only that an operator present film sheets one at a time in a non-overlapping sequence, to an input slot of the processor. However, the presentation of films one at a time, particularly if large sheet films are being used, is relatively slow compared to the amount of work involved.

Therefore, an object of my invention is to provide a new and improved film feeding arrangement of the type particularly adapted for use in self-threading roller transport sheet film processors.

In accordance with one embodiment of my invention a sloping tray is arranged to support a stack of exposed film sheets such as X-ray plates, positioned to be under pivotally mounted suction feeder cups. After the film sheets are placed on the tray, the automatic feeder is energized whereby a resilient cam system raises the tray so that a top sheet engages the feeder cups. The cam continues to rotate to drive the pivotal support of the cups toward the processor associated with my invention. This pivotal motion advances the top sheet toward an outlet guide and across a detector which deactivates the cam raising the tray so that it may then stop in a stand-by position while the first sheet continues to the processor. As soon as feeding of the first sheet has been accomplished, the detector provides a signal to re-energize the tray drive cam system and thus raise a next sheet to engage the feeder cups.

The subject matter which is regarded as my invention is particularly pointed out and distinctly claimed in the concluding portion of this specification. The invention, however, as to its organization and operation, together with further objects and advantages thereof will best be understood by reference to the following description taken in connection with the accompanying drawing, in which:

Figure 1:
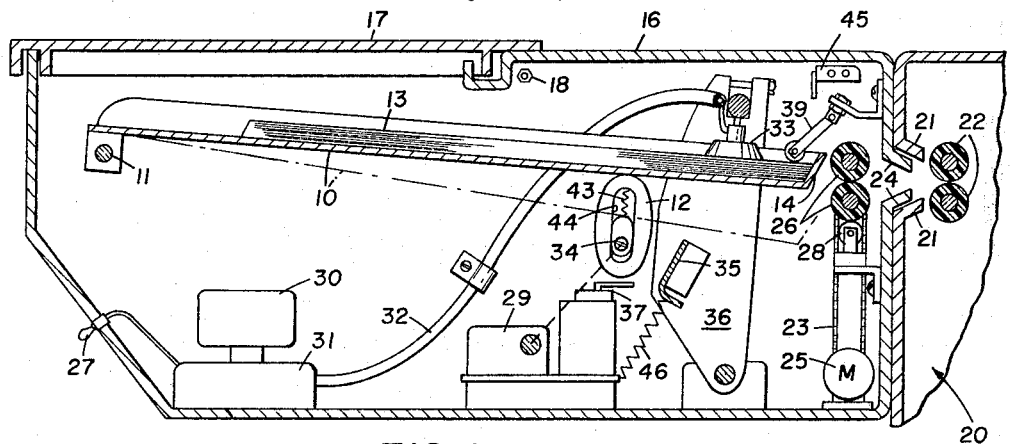
FIG. 1 is a simplified elevation view in cross-section of one embodiment of my invention.
Figure 2:
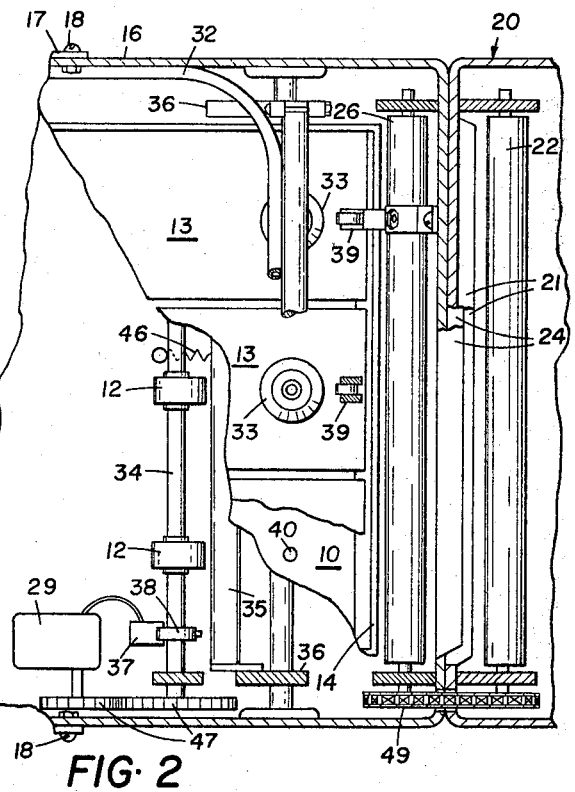
FIG. 2 is a top plan view, partially cut away, of a mechanism similar to that illustrated in FIG. 1.

Referring now to the drawing, wherein like reference numbers refer to similar parts, I have shown in FIG. 1 a sloping support tray 10 rotatable at one end about a pivot 11. Raising and lowering of the other end of the tray 10 is accomplished in accordance with the operation of rotatable cam lifters 12 near such other end. As illustrated, a stack (one indicated in FIG. 1 or stacks as indicated in FIG. 2) of the film sheets 13 has been placed on top of the tray 10 and rests at the lower end thereof against the tray end 14. A housing 16 for the tray 10 completely encloses it and the film sheets 13 thereon and is provided with an access cover 17 rotatable about hinge pins 18.

An input end of a conventional X-ray film processor 20 is indicated at the right of FIGS. 1 and 2 and has an inlet aperture defined by flaps 21. An initial pair of drive rollers 22 receives the film sheets 13 and transports them toward the processing tanks (not shown) within the processor 20. The housing 16 of the feeding apparatus is also provided with a pair of flaps or guide plates 24 which extend between and mate with the flaps 21.

The function of my invention, as should now be apparent, is accomplished by a motor 25 driving a pair of feed rollers 26 by means of a belt or chain 23 to transport the exposed film sheets 13 one at a time between the guide plates 24 to the processor input rollers 22. Since the tray 10 is sloping, the sheets will, particularly in the lowered position (as indicated in phantom in FIG. 1), remain in contact with the end 14. Once the tray 10 is loaded and the cover 17 is repositioned, a main switch 27 of the feeder is turned on. Closing of the switch 27 energizes the motor 25.

When the sheet feeder is loaded with the tray 10 in the lowered position, no film sheets lie between the feed rollers 26, and the first contacts of a microswitch detector 28 associated with roller 26 are in a closed position to initiate operation of a cam drive motor 29 and a pump motor 30 which drives a vacuum pump 31. The pump 31 draws air from a vacuum line 32 and thereby from a plurality of vacuum lift cups 33. Operation of the cam motor 29 rotates a shaft 34 supporting the cams 12 to lift the tray 10 so that the lower end of a top film sheet or sheets engages the vacuum lift cups 33 to be captured thereby. Continued rotation of the cams 12 causes them to lower the tray 10 and to engage a drive bar 35 secured to pivoted supports 36 which carry the vacuum lift cups 33, causing the cups 33 to be swung to the right (see FIG. 3) to present the captured film sheet to the feed rollers 26.

The upper roller 26 is fixed, and the lower roller 26 is biased upwardly. The roller of switch 28 is also biased upwardly so that the switch roller is always in contact with the lower roller 26. When there is no sheet 13 between the two rollers 26, the switch 28 is in its first position. When a single sheet 13 enters between the rollers 26, the small downward motion of lower roller will move the roller of switch 28 a small distance to its second position. When two or more sheets 13 enter between the rollers 26, the greater downward motion of lower roller 26, which motion is necessary to accommodate the greater thickness of the two or more sheets, will move the roller of switch 28 a greater distance to its third, or alarm, position. The effect of these switch positions will be later explained.

As soon as the leading edge of a film sheet passes between the rollers 26, contacts of detector switch 28 are opened so that the motor 29 may be de-energized. In order to provide a preselected spacing of the several film sheets, the cam drive shaft 34 is stopped in a preselected position. To accomplish this, a second switch 37 is coupled to shunt the switch 28 with the tray 10 in a raised position. The switch 37 is arranged to be opened by a cam 38 to stop the shaft at a selected orientation. Adjustment of the cam 38 on the shaft will provide ⅓, ½, ¾ etc. rotation thereof prior to the sheet being fed engaging the cups 33. In this manner a simple control of spacing between sheets is provided. The opening of the switch 37 stops the motor 29 until the film sheet being fed passes beyond the feed rollers 26. At that time the switch 28 is again closed to initiate another feed step.

To assure separation of the captured top sheet from underlying sheets so that the film sheets 13 are fed one at a time by the feeder rollers 26, I have provided a plurality of spring loaded deflectors 39. These deflectors 39 are spring biased to bend the captured top sheet as the tray moves downward whereby the sheets are separated at the time the end 14 of the tray is removed from in front of the feed rollers 26 and the cams 12 engage the drive bar 35 to advance the top sheet.

Figure 3:
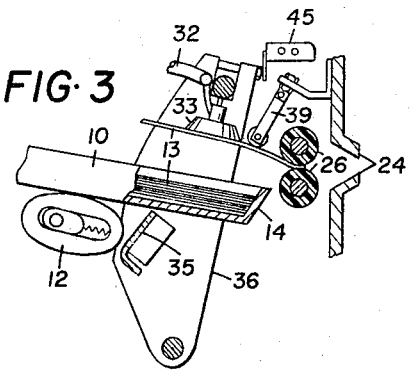
FIG. 3 is a partial elevation view of the mechanism shown in FIG. 1 in a slightly different position.

This operation is shown more clearly in FIG. 3 wherein the cams 12 have moved to a position engaging the bar 35. When the cams 12 are in this position, the tray 10 is lowered so that the top sheet may pass over the end 14 to the feed rollers 26. Also, the flexible deflectors 39 have returned to their lowermost (straight) position whereby the captured top sheet is bent substantially and thus separated from the remaining sheets which have again dropped down into the tray 10. Thus prevention of double feeding is assured.

In order to prevent the cups 33 from capturing the tray 10 itself when the tray is empty in at least one section, I have provided apertures 40 (FIG. 2) in the tray directly under each cup 33. In order that compression damage of the film sheets does not occur, I prefer to have the eccentric cams 12 resiliently supported on the shaft 34 as by springs indicated at 43 (FIG. 1). The springs 43 are located in slots or recesses 44 to provide a resilent upward drive of the cams 12.

In order that the film sheets may be more easily released from the vacuum cups 33, I have provided a switch 45 which de-energizes both the cam drive motor 29 and the vacuum pump motor 30 when the vacuum cups 33 are moved past the driven position (cams 12 and bar 35) by pulling on the film sheet during the transport by the rollers 26 (see FIG. 3). The switch 45 is shown positioned to be engaged by the upper portion of one of the pivot supports 36. Return of the cups 33 to standby when the cams 12 release the bar 35 is assured by a spring 46.

Referring again to FIG. 2 the motor 29 is coupled to the shaft 34 of the cams 12 by reduction gearing 47 such that the cam shaft 34 rotates at about two revolutions per minute. As will become apparent, the speed of the feed rollers 26 controls the velocity of the sheet feed and the speed and the amount of lead in rotation (as controlled by the cam 38) of the shaft 34 controls the spacing of the film sheets in the processor 20.

In FIG. 1 the motor 25 is shown as coupled to the feed rollers 26 by the chain drive system 23 such that the surface velocity of the roller 26 corresponds to or is less than that of the rollers 22. This surface velocity will be of the order of 10 to 20 inches per minute for most of X-ray film processors currently being sold. In order to assure synchronization of the rollers 26 and 22, I prefer to insert in the drive system a unidirectional slipping clutch (not shown) which may be over-driven by the rollers 22 pulling a film sheet faster than the feed rollers 26 are being driven.

As discussed above, operation of the shaft 34 at about two revolutions per minute results in about 2 or 3 inches spacing when the cams 12 must be rotated about ½ revolution from their rest position to bring about engagement of a top sheet of the stack with the feed rollers 26. Spacing less than this raises unnecessary possibilities of interference between two consecutive film sheets 13.

Also in FIG. 2, I have shown a modification of the present invention wherein the feed rollers 26 are driven in accordance with the driving of the rollers 22 through a sprocket and chain drive arrangement 49. When using such a sprocket and chain drive arrangement, the velocity and thereby the synchronization of the feed rollers 26 is directly controlled by the processor 20.

Figure 4:
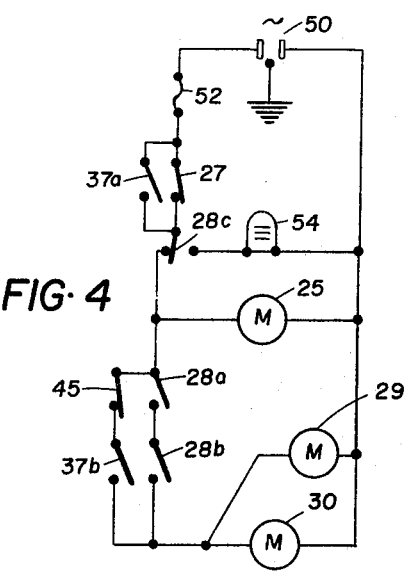
FIG. 4 is a schematic diagram of a power circuit suitable for use with my invention.

Referring now to FIG. 4, a power supply, which may include a plug 50 suitable for connection to the usual 120-voltage A.C. sources, supplies power through a fuse 52 to the main switch 27, with the switch contactors 37a being coupled in parallel therewith to prevent shut down of the system except with the cams 12 in the predetermined ready position. The switch 27 directly energizes the feed roller motor 25 and energizes the motors 29 and 30 through switch contactors 28a, 28b and 28c of detector switch 28.

The two serially coupled single pole switch contactors 28a and 28b are located in the machine one near each end of the feeder rollers 26. Thus operation of either one or both of the switch contactors will open one of the circuits to the motors 29 and 30. The switch contactor 37a is also shown in the open position which occurs at any time the cam drive 12 is in the predetermined rest position according to the setting of cam 38. Thus, the position of the switches of FIG. 4 indicates a feeding operation is in progress with the tray 10 in a lowered position and both the blower and cam drive motors 29 and 30 at standby.

In the event of a double thickness feeding, the normally closed contactor 28c of switch 28 is moved from its normal drive position as indicated to an alarm position to energize a buzzer 54. The switch contactor 45 is normally closed and is coupled in series with the switch contactor 37b to allow release of the captured sheet when being transported by the roller 26 as discussed above.

While I have shown a particular embodiment of my invention other modifications may occur to those skilled in this art. Therefore, I intend the appended claims to cover all such modifications that fall within the proper scope of my invention.

I claim:

1. A film sheet feeder for sequentially supplying exposed film sheets in an edgewise fashion to a film processor input, comprising:

a sloping tray for holding a stack of sheets;

a plurality of vacuum lift cups located over the lower end of said tray;

a cam drive means operable to periodically raise the lower end of said tray so that a top sheet of the stack is captured by at least one of said cups to be transported thereby to the processor input;

a movable support for said cups positioned to pivotably respond to said cam drive means only after said tray has been raised and partially lowered by said cam drive means;

a pair of feed rollers aligned to receive the captured top sheet when said cups are pivoted by said cam drive means;

means for continuously driving said feed rollers; and means for selectively driving said cam drive means.

2. A film sheet feeder as in claim 1 in which said cam means is resiliently drivable to a position that will result in maximum elevation of said tray whereby a thick stack of sheets will prevent such maximum elevation by compression of resilient means without excessive pressure to the sheets.

3. A film sheet feeder as in claim 1 having:

control means responsive to the transport of a sheet by said feed rollers to initiate operation of said selective driving means when no sheet is being thus transported.

4. A film sheet feeder as in claim 3 having a switch means in parallel with said control means and selectively operable in accordance with the position of said cam drive means to stop said tray in a selected position, the operation of said switch means being selectable to establish the spacing between successive sheets transported by said feed rollers.

5. A sheet feeder for sequentially supplying exposed film sheets edgewise to a film processor, comprising:

a sloping tray for holding a stack of sheets at its lower end;

feed rollers located adjacent to the lower end of said tray;

means for driving said feed rollers at a surface speed corresponding to that of a pair of input rollers of the roller transport mechanism;

a vacuum lift cup over the lower end of said tray and mounted for movement toward said feed roller;

a cam drive means operable to periodically raise the lower end of said tray and move said cups so that a top sheet of the stack is captured by said cup and is then carried thereby to said feed rollers.

6. A sheet feeder as in claim 5 wherein:

said cam drive means being of the off-center type with the larger portion thereof defining a recess;

a spring compressed within the recess of said cam means to determine the upward pressure of the stack against said cup;

a resilient finger positioned adjacent to said cup and biased to a position slightly lower than said cup, to deflect the captured sheet downward for separating the captured sheet from the stack;

a motor coupled to drive said cam means to raise and lower said tray;

first switch contactor means responsive to the feeding of a sheet by said feed rollers to energize said motor only when a sheet is not being fed thereby; and second switch means in parallel with said first switch means and responsive to the position of said cam drive means to maintain energization of said motor only when said tray is in a raised position and to control stopping of said tray in a lowered position.

7. A sheet feeder as in claim 5 wherein said feed roller drive means includes a driving coupling between feed rollers and the processor input rollers.

8. A sheet feeder as in claim 6 including a main starting switch and a switch contactor coupled in parallel therewith and operable in accordance with said second switch means to assure stopping of said cam drive means in a lowered position.

References Cited by the Examiner

UNITED STATES PATENTS

| | | | |
|---|---|---|---|
| 2,626,147 | 1/1953 | Gjostein | 271—89 X |
| 2,960,334 | 11/1960 | Trombetta | 271—62 |

EVON C. BLUNK, *Primary Examiner.*

H. LANE, *Assistant Examiner.*